United States Patent
Zhang et al.

(10) Patent No.: US 12,014,679 B2
(45) Date of Patent: Jun. 18, 2024

(54) REDUCING BLINKING PIXELS IN DISPLAYS

(71) Applicant: Google LLC, Mountain View, CA (US)

(72) Inventors: Yi Zhang, San Diego, CA (US); Seobin Jung, Santa Clara, CA (US); Kuan-Lin Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/262,125

(22) PCT Filed: Aug. 13, 2020

(86) PCT No.: PCT/US2020/046064
§ 371 (c)(1),
(2) Date: Jan. 21, 2021

(87) PCT Pub. No.: WO2021/030530
PCT Pub. Date: Feb. 18, 2021

(65) Prior Publication Data
US 2022/0310004 A1     Sep. 29, 2022

Related U.S. Application Data

(60) Provisional application No. 62/886,492, filed on Aug. 14, 2019.

(51) Int. Cl.
*G09G 5/10* (2006.01)
*B01D 53/94* (2006.01)
(Continued)

(52) U.S. Cl.
CPC ....... *G09G 3/3225* (2013.01); *B01D 53/9431* (2013.01); *B01F 23/2132* (2022.01);
(Continued)

(58) Field of Classification Search
CPC .... G06F 3/0412; G06F 1/1605; G06F 1/1637; G09G 3/006; G09G 3/3233;
(Continued)

(56) References Cited

U.S. PATENT DOCUMENTS

| | | |
|---|---|---|
| 2013/0176251 A1 | 7/2013 | David et al. |
| 2015/0022439 A1 | 1/2015 | Alameh et al. |

(Continued)

FOREIGN PATENT DOCUMENTS

| | | |
|---|---|---|
| EP | 2325735 | 5/2011 |
| EP | 3291217 | 3/2018 |

(Continued)

OTHER PUBLICATIONS

TW Office Action in Taiwanese Appln. No. 109127773, dated Apr. 30, 2021, 6 pages (with English translation).

(Continued)

*Primary Examiner* — Jennifer T Nguyen
(74) *Attorney, Agent, or Firm* — Fish & Richardson P.C.

(57) ABSTRACT

Reducing blinking pixels in a display includes detecting a first timing of activation of one or more emissive elements of the display, detecting a second timing of sensing pulses from a sensor arranged to detect radiation transmitted through the display, determining, based on the first timing and the second timing, a synchronized timing that staggers the activation of the one or more emissive elements of the display and the sensing pulses from the sensor, and dynamically altering, based on the determined synchronized timing, a subsequent timing of the sensing pulses from the sensor to reduce blinking of at least some of the pixels compared to blinking associated with the synchronized timing.

18 Claims, 4 Drawing Sheets

(51) Int. Cl.
  *B01F 23/213* (2022.01)
  *B01F 25/314* (2022.01)
  *B01F 27/112* (2022.01)
  *F01N 3/20* (2006.01)
  *F02B 37/18* (2006.01)
  *G09G 3/3225* (2016.01)

(52) U.S. Cl.
  CPC .......... *B01F 25/314* (2022.01); *B01F 27/112* (2022.01); *F01N 3/2066* (2013.01); *F02B 37/183* (2013.01); *B01F 2215/0422* (2013.01); *F01N 2610/08* (2013.01); *F01N 2610/1433* (2013.01); *F01N 2610/1453* (2013.01); *G09G 2320/0233* (2013.01)

(58) Field of Classification Search
  CPC ...... G09G 3/3225; G09G 3/20; G09G 3/3283; G09G 2320/0626; G09G 2320/0233; G09G 2320/043; G09G 2360/14; G09G 3/3208; G09G 2300/0842; G09G 2360/144; G09G 2360/145
  USPC .......................................................... 345/691
  See application file for complete search history.

(56) References Cited

U.S. PATENT DOCUMENTS

| | | |
|---|---|---|
| 2016/0092010 A1 | 3/2016 | Manu et al. |
| 2017/0220838 A1 | 1/2017 | He et al. |
| 2018/0063435 A1* | 3/2018 | Cho .................. H04N 23/67 |
| 2018/0348049 A1* | 12/2018 | Yoon .................. G09G 3/3208 |
| 2020/0242985 A1* | 7/2020 | Cho .................. G06F 3/0412 |
| 2021/0272302 A1* | 9/2021 | Yang .................. H04M 1/0266 |

FOREIGN PATENT DOCUMENTS

| | | |
|---|---|---|
| TW | 201327267 | 7/2013 |
| TW | 201342145 | 10/2013 |
| TW | 201421280 | 6/2014 |
| WO | WO 2019/128250 | 7/2019 |

OTHER PUBLICATIONS

PCT International Preliminary Report in International Appln No. PCT/US2020/046064, dated Feb. 24, 2022, 7 pages.
PCT International Search Report and Written Opinion in International Appln. No. PCT/US2020/046064, dated Nov. 2, 2020, 12 pages.

* cited by examiner

REDUCING BLINKING PIXELS IN DISPLAYS

CROSS-REFERENCE TO RELATED APPLICATION

This application is a National Stage Application under 35 U.S.C. § 371 and claims the benefit of International Application No. PCT/US2020/046064, filed Aug. 13, 2020, which claims priority to U.S. Application No. 62/886,492, filed Aug. 14, 2019, the disclosure of which is incorporated herein by reference.

FIELD

This specification relates to sensors placed under displays.

BACKGROUND

Proximity sensors emit a beam of IR light and measure reflected power to detect the proximity of objects. Traditionally, proximity sensors use a train of short pulses to obtain a strong enough signal-to-noise ratio to measure the reflected power while maintaining low power consumption. The pulse sequence is generally controlled solely by the proximity sensor with settings such as pulse length, pulse number, and wait time. When a proximity sensor is placed under a display, these IR pulses interact with the display driving circuit during its operation, causing display pixels to appear white because of an interruption in control voltage to the driving circuit and producing an undesired blinking phenomenon.

SUMMARY

In recent years, there has been a trend of rapidly reducing display bezel size and increasing a device's screen to body ratio. The proximity sensor, which is generally placed under glass in a bezel area at the top of a device's display, can be placed under a display to further reduce bezel size. As a side effect of IR pulses from the proximity sensor interacting with a driving circuit of the display during its operation, a group of pixels above the sensor location alternate between a normal state and appearing white when the sensor is enabled, for example, during a phone call. This visible blinking spot on the display negatively impacts the user experience.

The proposed methods reduce blinking pixels in displays by synchronizing proximity sensors with the displays such that the proximity sensors only emit IR pulses when the affected display pixels are turned off. One such period can be between two frames when a display refreshes. Another period can be an off time when the display is driven in pulse width modulation (PWM) mode. By adding a hardware interrupt input and software programmable delay to a proximity sensor controller, the proximity sensor can use the display control signal as a trigger for emitting IR pulses to avoid the period when the pixels are on, eliminating the blinking pixels.

The proposed methods for reducing blinking pixels in a display include detecting a first timing of activation of one or more elements of the display, detecting a second timing of sensing pulses from a sensor arranged to detect radiation transmitted through the display, determining, based on the first timing and the second timing, a synchronized timing scheme that staggers the activation of the one or more elements of the display and the sensing pulses from the sensor, and dynamically altering, based on the determined synchronized timing, a subsequent timing of the sensing pulses from the sensor to reduce blinking of at least some of the pixels. The blinking of the pixels may be reduced (compared to blinking that occurs when the synchronized timing scheme is not used) by controlling, based on the determined synchronized timing scheme, the emission of sensing pulses from the sensor to occur at times when the one or more display elements are not activated. The proposed methods may be applied to a display having light-emissive display elements, but the disclosure is not limited to this and the proposed methods may also be applied to other types of displays such as, for example, a display with transmissive display elements.

Other methods for reducing blinking pixels in a display, comprise: determining, based on a first timing of activation of one or more display elements of the display and on a second timing of sensing pulses from a sensor arranged to detect radiation transmitted through the display, a synchronized timing scheme that staggers the activation of the one or more display elements of the display and the sensing pulses from the sensor; and controlling, based on the determined synchronized timing scheme, the emission of sensing pulses from the sensor to occur at times when the one or more display elements are not activated and thereby reduce blinking of at least some of the pixels. Again, The proposed methods may be applied to a display having light-emissive display elements, but the disclosure is not limited to this and the proposed methods may also be applied to other types of displays such as, for example, a display with transmissive display elements.

In some implementations, dynamically altering the subsequent timing of the sensing pulses from the sensor integrated with the display comprises executing a hardware interrupt.

In some implementations, dynamically altering the subsequent timing of the sensing pulses from the sensor integrated with the display comprises executing a software delay.

In some implementations, the activation of the one or more elements of the display comprises refreshing the display.

In some implementations, the activation of the one or more elements of the display comprises the control, through pulse width modulation, of the display.

In some implementations, dynamically altering a subsequent timing of the sensing pulses comprises dynamically altering a subsequent timing of the sensing pulses based on detection of a detected event in a display control signal. For example, sensing pulses may be controlled to occur after a time delay (relative to the detection of the event in the display control signal). The duration of the display may be chosen such that the emission of the sensors pulses occurs when the one or more elements of the display are not activated Other embodiments of this aspect include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
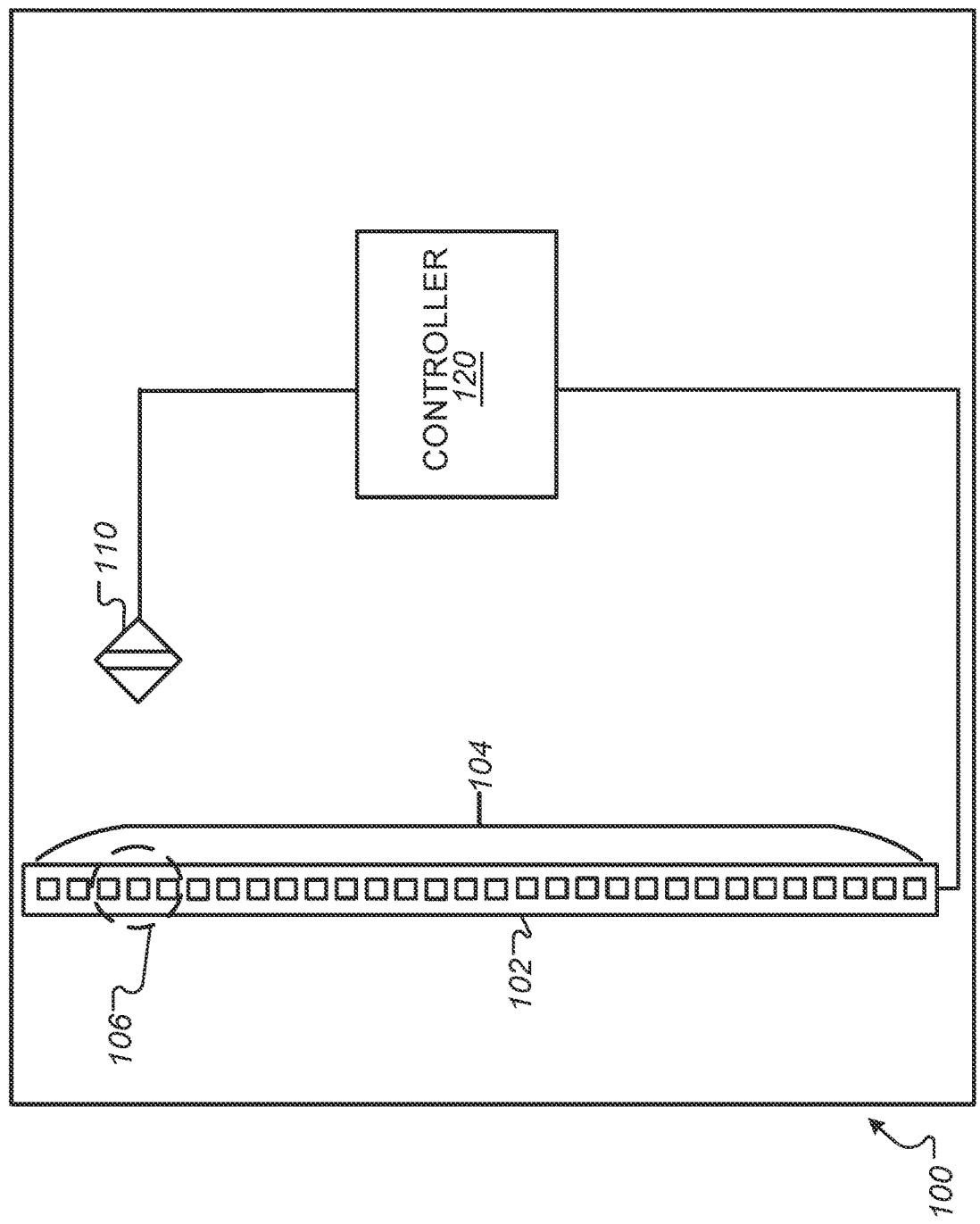
FIGS. 1 and 2 are diagrams of an example configuration of a display system.

Device manufacturers have begun placing sensors, including proximity sensors, under device displays order to reduce bezel size and increase a device's screen to body ratio to provide a more pleasant user experience. IR pulses from the proximity sensor interfere with control voltage delivered to driving circuits of light-emissive or light-blocking elements of a display device, such as individual pixels. This interference results in a visible blinking spot on the display, which degrades the quality of a displayed image. This can also be distracting to users and negatively impacts the user experience. While the wavelength of IR pulses emitted by proximity sensors is not actually visible, the emitted IR light disturbs the control voltage provided for controlling light-emissive or light-blocking elements of the display thereby producing a visible blinking white dot on the display above the location of the proximity sensor.

The visible white dot appears even in implementations in which the display is an organic light-emitting diode (OLED) display that does not use a backlight, because the IR pulses emitted by the proximity sensor interact with the transistor or transistors that drive each pixel or multiple pixels of the display above the location of the proximity sensor when IR pulses are emitted.

This visible degradation of the display quality appears when the proximity sensor is enabled to detect whether a user is proximate to the display and either turn on or turn off the display. For example, during a phone call, the proximity sensor can be enabled to detect whether the user's face is near the display to turn off the screen and prevent accidental interactions with the screen.

The proposed methods and systems use a synchronized time scheme for control of emission of IR pulses from a proximity sensor and control of light-emissive or light-blocking elements of a display under which the proximity sensor is placed. (By "synchronized time scheme" is meant that the emission of IR pulses from the proximity sensor is controlled in conjunction with the driving of the (or some of the) light-emissive or light-blocking elements of a display—it does not require that the proximity sensor is controlled to emit pulses at the same time as light-emissive or light-blocking elements of the display are driven.) Synchronization of control of emission of IR pulses from a proximity sensor and control of light-emissive or light-blocking elements of a display under which the proximity sensor is placed can include triggering a control signal for the proximity sensor off of (that is, based on) a control signal for pixels of the display. For example, a controller can implement a trigger based on the control signal for one or more pixels of the display and provide a subsequent delay, compared to the control signal for the one or more pixels, to the control signal for the proximity sensor such that the proximity sensor only emits IR pulses when the some or all pixels of the display are not being driven (and so, in a display with light-emissive pixels, are off). The control signal for the proximity sensor may be controlled based on a control signal for all the pixels of the display. Alternatively, the control signal for the proximity sensor may be controlled based on a control signal for some (but not all) of the pixels of the display, such as, for example pixels in a region of the display coincident with, within, overlapping, or containing, the proximity sensor. By staggering the emission of IR pulses from the proximity sensor with the emissions of the display, or with the emissions of a part of the display where the proximity sensor is located, the proposed methods and systems reduce the visible blinking of pixels in the display above the location of the proximity sensor.

The proposed methods and systems can be implemented automatically. For example, the controller can automatically detect the control signal or timing of emissive elements of the display and determine a delay to apply to the control signal of the proximity sensor. The controller can detect, for example, a refresh rate of the display, or a timing of when pixels of the display are turned off.

Figure 2:
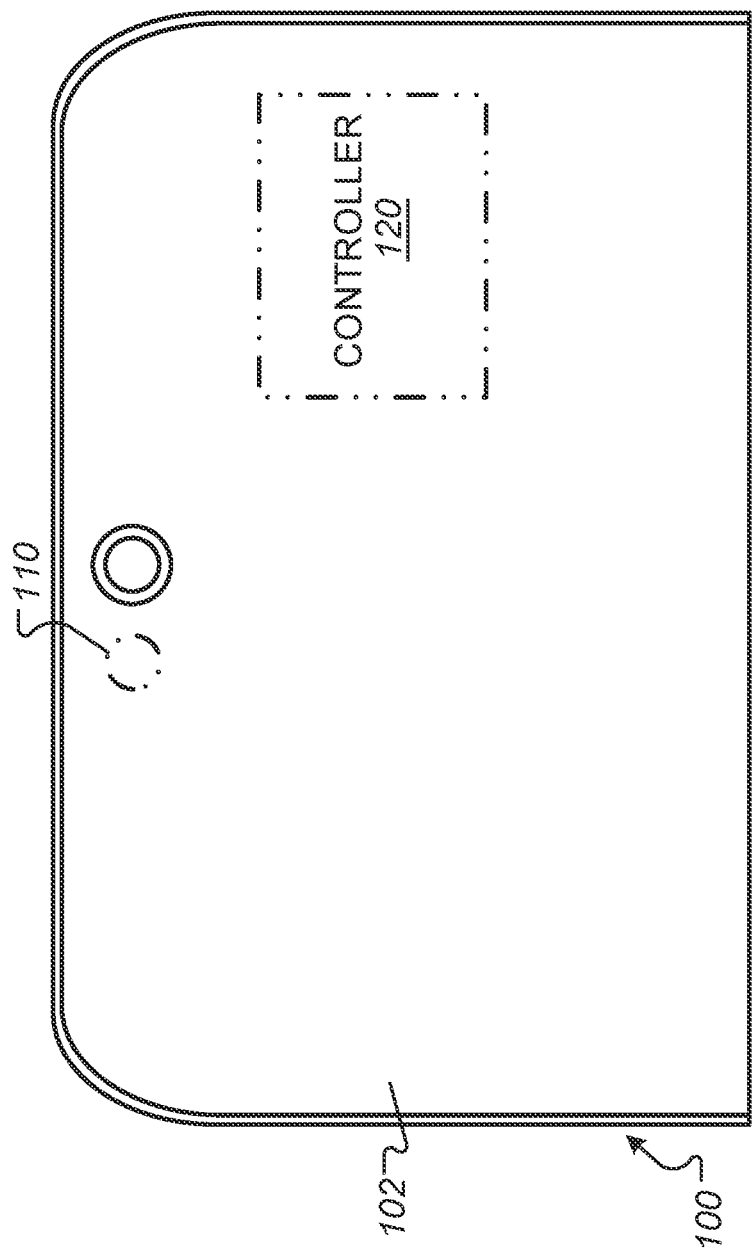

FIGS. 1 and 2 are diagrams of an example configuration of a display system 100. Display system 100 performs synchronization of light-emissive or light-blocking elements of a display and the emission of IR pulses by a proximity sensor underneath the display. For example, display system 100 can automatically calibrate the proximity sensor to emit IR pulses for detection of objects proximate to the display only when certain pixels of the display are off.

Display system 100 is an electronic device capable of displaying information through display 102. Example devices include cellphones, smartphones, tablets, and other portable mobile devices, as well as less portable devices such as personal computers, mobile work stations, laptop computers, and televisions, among other devices. In this particular example, display system 100 is a smartphone.

As shown in FIG. 1, display system 100 includes display 102 having emissive or light-blocking elements 104, proximity sensor 110, and controller 120.

Display 102 is a hardware component that displays information and can act as a component of a user interface. Display 102 can be, for example, a liquid crystal display (LCD), or a type of light emitting device (LED) display, such as an OLED, including a passive-matrix or active-matrix OLED (PMOLED or AMOLED). In this particular example, display 102 is an AMOLED screen of smartphone 100.

This embodiment will be further described with reference to a display system in which the elements 104 of display 102 are elements that emit light, but the general principles are applicable also to a display system having a transmissive display (such as an LCD display) in which the elements of display are elements that can be controlled to either block or transmit light through the display. In some implementations, emissive elements 104 of display 102 can be, for example, matrices of pixels that are controlled as a unit. These matrices include any configuration of two or more pixels. For example, a matrix of pixels can include a single row of pixels, a 16×16 block of pixels, etc. In this particular example, emissive elements 104 of AMOLED display 102 are individual pixels that are controlled independently of the other pixels, and independently emit light.

Display 102 and emissive elements 104 of display 102 can be controlled through a driving control voltage. In some implementations, display 102 and emissive elements 104 of display 102 can be controlled through PWM.

Proximity sensor 110 is a sensor that detects whether objects are proximate to display 102. Proximity sensor 110 emits IR pulses and detects reflected power to determine the presence and/or distance of objects with respect to display 102. Proximity sensor 110 can determine how far an object is from display 102 within, for example, a range of 0 to 2 ft. The range of operation possible for proximity sensor 110 can depend on the power of the IR pulses emitted. In some implementations, proximity sensor 110 simply detects whether there is an object within a threshold distance of display 102. For example, proximity sensor 110 can detect whether a user's face is within 3 inches of display 102. The range of operation possible for the threshold distance used by proximity sensor 110 can depend on the power of the IR pulses emitted.

Controller 120 includes one or more computer processors that control the operation of various components of display system 100, including proximity sensor 110, and components external to display system 100, including systems that are integrated with display system 100. In some implementations, controller 120 controls the operation of components of display system 100 including display 102 and emissive elements 104 of display 102.

Controller 120 generates control signals for display system 100 locally. The one or more computer processors of controller 120 continually and automatically determine control signals for display system 100 without communicating with a remote processing system. For example, controller 120 can detect timing data for emissive elements 104 and proximity sensor 110; process the data to determine control signals; and generate subsequent control signals for proximity sensor 110.

Controller 120 is communicatively connected to proximity sensor 110. In some implementations, controller 120 is connected to proximity sensor 110 through communications buses with sealed conduits that protect against solid particles and liquid ingress. In some implementations, controller 120 transmits control signals to components of display system 100 wirelessly through various wireless communications methods, such as RF, sonic transmission, electromagnetic induction, etc.

In some implementations, controller 120 can be communicatively connected to display 102 and/or emissive elements 104 of display 102. Controller 120 can be connected to display 102 and/or emissive elements 104 through communications buses with sealed conduits that protect against solid particles and liquid ingress. In some implementations, controller 120 transmits control signals to components of display system 100 wirelessly through various wireless communications methods, such as RF, sonic transmission, electromagnetic induction, etc.

Controller 120 can be communicatively connected to components other than display 102 and/or emissive elements 104 of display 102, and can use other data received to generate control signals for display system 100.

Controller 120 detects a timing of the activation of emissive elements 104. In some implementations, detecting the timing of the activation of emissive elements 104 includes detecting a display control signal that instructs each of the pixels 104 to turn on or turn off. Alternatively, the controller 120 can detect a timing of the activation of a portion of emissive elements 104. For example, controller 120 can determine, based on a location of proximity sensor 110, that control voltage to a subset 106 of emissive elements 104 is affected by the IR pulses from proximity sensor 110. Controller 120 can detect, based on determining that only subset 106 is affected by the operation of proximity sensor 110, the timing of the activation of the emissive elements within subset 106.

For example, the display control signal can be a voltage that controls whether an emissive element 104 is on or off. In some implementations, the display control signal can be a PWM signal having a duty cycle and frequency that is higher than discernable by human eyes. PWM is used in display systems to allow a user to adjust the brightness of a display, for example, by dimming or increasing the brightness of display 102. The amount of current provided by the signal is used to drive the brightness of the display.

In some implementations, controller 120 can dynamically alter timing signals to proximity sensor 110 to control proximity sensor 110 to emit IR pulses during off periods of a duty cycle of a digital signal used to control display 102 and emissive elements 104 or the subset 106 of emissive elements. For example, controller 120 can use a falling edge of a digital signal controlling the emissive elements 104 or the subset 106 of emissive elements as a trigger for a control signal for proximity sensor 110, such that when the digital signal is low, and emissive elements 104 or subset 106 are off, proximity sensor 110 will emit an IR pulse. By controlling the proximity sensor 110 to emit an IR pulse when the digital signal driving the emissive elements 104 or subset 106 is low, the proximity sensor 110 may emit an IR pulse without interfering with the control voltage to emissive elements 104 or subset 106 and thereby reducing or eliminating a visible blinking effect when proximity sensor 110 is in operation.

In some implementations, detecting the timing of the activation of emissive elements 104 includes detecting a refresh rate of display 102 at which an image displayed on display 102 is redrawn by restarting and updating each of the emissive elements 104. In between each refresh, emissive elements 104 are off, and therefore there is no control voltage provided to any of the emissive elements 104 to be disturbed by an IR pulse from proximity sensor 110. Accordingly, driving the proximity sensor to emit IR pulses at a time between refreshes of the display again reduces or eliminates a visible blinking effect when proximity sensor 110 is in operation.

In some implementations, controller 120 can dynamically alter timing signals to proximity sensor 110 to control proximity sensor 110 to emit IR pulses while display 102 is between refreshes such that each of the emissive elements 104 or subset 106 are off and a control voltage to the emissive elements 104 or subset 106 will not be affected by the IR pulses emitted by proximity sensor 110.

FIG. 2 illustrates another view of display system 100. In this particular embodiment, display system 100 is a smartphone having an AMOLED display 102 and an IR proximity sensor 110 under display 102.

Figure 3:
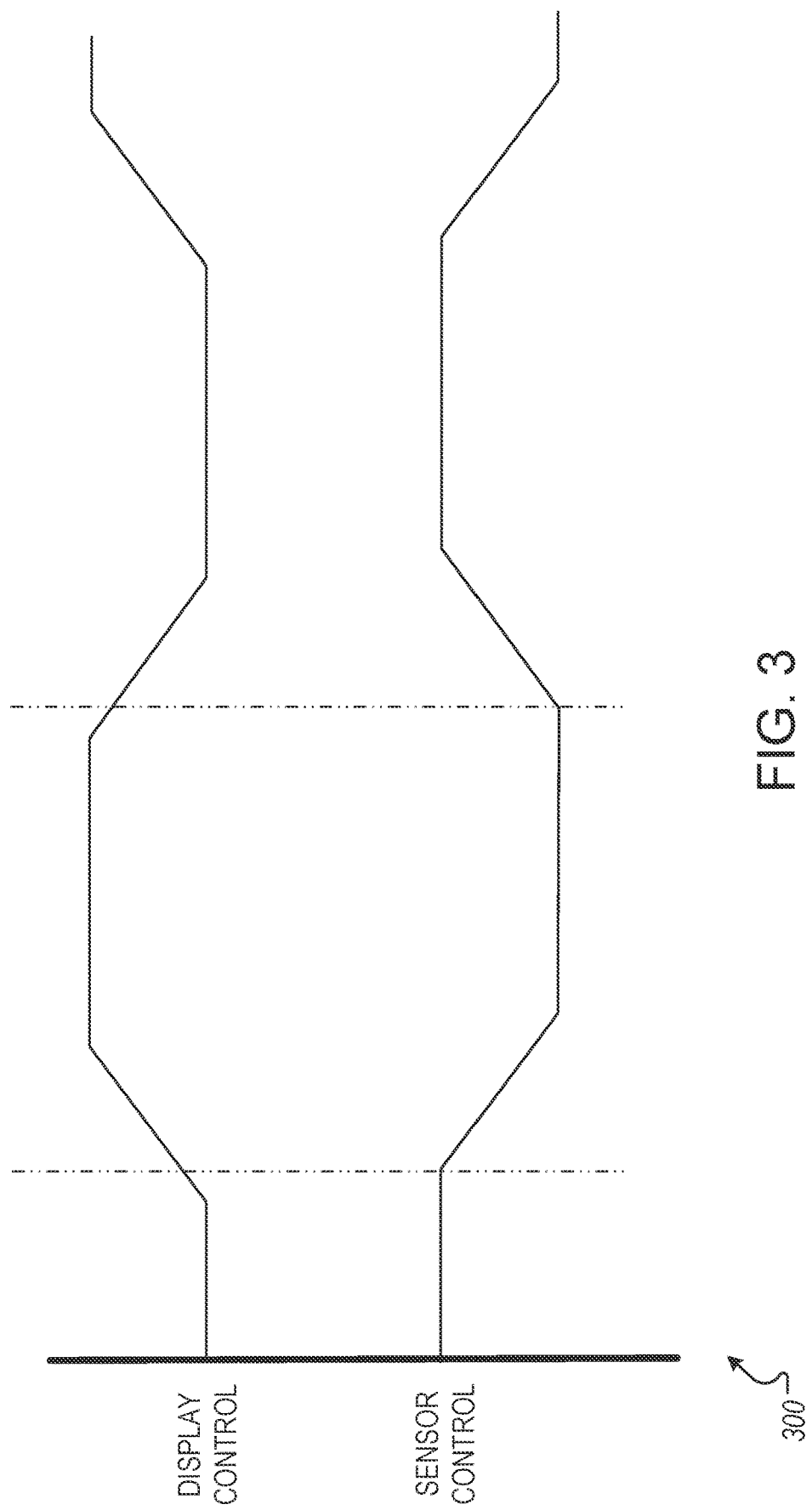
FIG. 3 is a timing diagram of sensor and display control signals produced by the display system of FIGS. 1 and 2.

FIG. 3 is a timing diagram of sensor and display control signals produced by the display system of FIGS. 1 and 2.

Controller 120 staggers the activation of proximity sensor 110 relative to the activation of emissive elements 104 and/or subset 106 such that proximity sensor 110 emits IR pulses when emissive elements 104 and/or subset 106 are off to reduce interference between the IR pulses and a voltage provided to emissive elements 104 and/or subset 106.

In this particular example, emissive elements 104 and/or subset 106 of display 102 are driven by a PWM signal. Controller 120 may for example detect a timing of activation of emissive elements 104 and/or subset 106 by detecting a rising edge of the display control signal and, based on this detection, then trigger an off-signal for proximity sensor 110, thus staggering times at which emissive elements 104 and/or subset 106 are on and times at which proximity sensor 110's IR pulses are emitted. Alternatively the controller 120 may detecting a falling edge of the display control signal and, based on this detection, then trigger an on-signal for proximity sensor 110 to emit an IR pulse, again staggering times at which emissive elements 104 and/or subset 106 are on and times at which proximity sensor 110's IR pulses are emitted.

In one implementation, the controller 120 triggers a software programmable delay off of the detection of the display control signal as a trigger for emitting IR pulses to avoid the period during which emissive elements 104 are on, thereby reducing the occurrence of blinking pixels through the reduction of interference between the IR pulses from proximity sensor 110 and the display control signal for emissive elements 104. Controller 120 can be calibrated on the sensor side such that detection of a falling edge of a display control signal triggers a programmable delay for a sensor control signal to proximity sensor 110. Calibrating controller 120 on the sensor side eliminates the need to time the control of various emissive element matrices 104 or 106 of display 102 with the activation of proximity sensor 110; instead, IR pulse emission by proximity sensor 110 is simply calibrated to be staggered from activation of emissive elements 104 and/or subset 106.

In some implementations, controller 120 can introduce a hardware interrupt input such that activation of emissive elements 104 and/or subset 106 triggers a control signal for proximity sensor 110. For example, controller 120 can be calibrated on the display side such that activation of emissive elements 104 and/or subset 106 sends an interrupt signal that, after a suitable time delay as discussed below, triggers a sensor control signal for proximity sensor 110 to cause emission of IR pulses.

Figure 4:
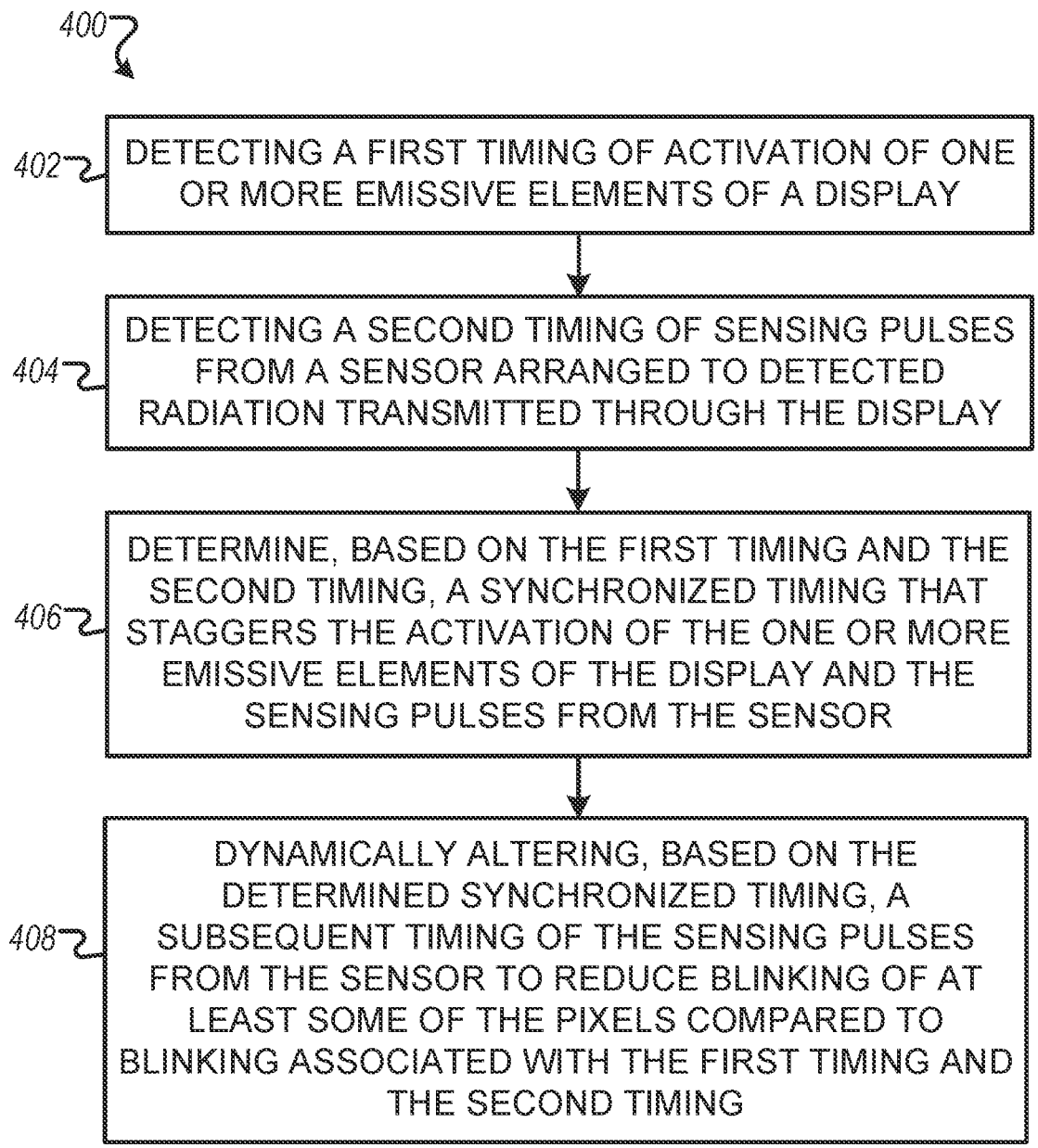
FIG. 4 is a flow chart of an example process of reducing blinking pixels in a display.

FIG. 4 is a flow chart of an example process 400 of reducing blinking pixels in a display. Process 400 can be implemented by display systems such as system 100 as described above with respect to FIGS. 1 and 2. In this particular example, process 400 is described with respect to system 100 in the form of a smartphone device. Briefly, according to an example, the process 400 begins with detecting a first timing of activation of one or more emissive elements of the display (402). For example, controller 120 can detect a display control signal for display 102 that controls the timing of display 102 turning on and off, or the rate at which display 102 refreshes. Controller 120 detects the display control signal by receiving the display control signal as an input. In some implementations, controller 120 detects the display control signal by using a sensor.

Process 400 continues with detecting a second timing of sensing pulses from a sensor arranged to detect radiation transmitted through the display (404). For example, controller 120 can detect a sensor control signal for proximity sensor 110 that controls the timing of proximity sensor 110 emitting IR pulses. Controller 120 detects the sensor control signal by receiving the sensor control signal as an input. In some implementations, controller 120 generates the sensor control signal. In other implementations, controller 120 detects the sensor control signal by using a sensor.

Process 400 continues with determining, based on the first timing and the second timing, a synchronized timing scheme that staggers the activation of the one or more emissive elements of the display and the sensing pulses from the sensor (406). For example, controller 120 can determine, based on the display control signal and the sensor control signal, a synchronized timing scheme that staggers the timing of display 102 turning on and off, or the rate at which display 102 refreshes, with the IR pulses of proximity sensor 110.

Process 400 concludes with dynamically altering, based on the determined synchronized timing scheme, a subsequent timing of the sensing pulses from the sensor to reduce blinking of at least some of the pixels compared to blinking associated with the first timing and the second timing (408). For example, controller 120 can dynamically alter, based on the determined synchronized timing scheme, a subsequent sensor control signal for proximity sensor 110 that controls the timing of proximity sensor 110 emitting IR pulses to stagger the IR pulses with the display control signal, thereby reducing blinking of at least some of the pixels of display 102 compared to blinking associated with the detected first timing of the activation of one or more emissive elements of the display and the detected second timing of sensing pulses from a sensor arranged to detect radiation transmitted through the display. Controller 120 can dynamically alter the sensor control signal for proximity sensor 110 to use the display control signal as a trigger for emitting IR pulses and avoid emitting IR pulses in a period during which emissive elements 104 (or the subset 106 of emissive elements) are on, thereby reducing the occurrence of blinking pixels through the reduction of interference between the IR pulses from proximity sensor 110 and the display control signal for emissive elements 104. For example the controller 120 can detect a particular event in the display control signal, and trigger the emission of IR pulses to follow the event with a time delay that ensure that IR pulses are emitted in a period during which emissive elements 104 (or the subset 106 of emissive elements) are off. As an example if the controller detects an event that indicates that display elements are being turned on (such as a rising edge in a display control signal), the controller may trigger the emission of IR pulses after a delay period that is slightly greater than the time required for the display control signal to have returned to a level at which the emissive elements 104 (or the subset 106 of emissive elements) are off. Conversely, if the controller detects an event that indicates that display elements are being turned off (such as a falling edge in a display control signal), the controller may trigger the emission of IR pulses after a short delay so that IR pulses are emitted while the display control signal is at a level at which the emissive elements 104 (or the subset 106 of emissive elements) are off. The controller may effect a suitable time delay before triggering the emission of IR pulses by introducing a hardware interrupt input and/or a software programmable delay.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method for reducing blinking pixels in a display of a computing device, comprising:
   detecting, by a controller of the computing device, a first timing of activation of one or more emissive elements of the display;

detecting, by the controller, a second timing of infrared pulses emitted by a sensor arranged to both emit infrared pulses and detect infrared radiation transmitted through the display;

determining, by the controller based on the first timing and the second timing that were previously detected by the controller, a synchronized timing scheme that staggers the activation of the one or more emissive elements of the display and the emission of sensing pulses emitted by the sensor; and dynamically altering, by the controller based on the determined synchronized timing scheme, a subsequent timing of the infrared pulses emitted by the sensor so that the infrared pulses are emitted by the sensor while the one or more emissive elements of the display are off, reducing an amount of blinking of at least some of the pixels compared to an initial amount of blinking that occurred as a result of the one or more emissive elements of the display activating with the first timing and the sensor emitting infrared pulses with the second timing.

2. The method of claim 1, wherein dynamically altering the subsequent timing of the infrared pulses emitted by the sensor comprises executing a hardware interrupt.

3. The method of claim 1, wherein dynamically altering the subsequent timing of the infrared pulses emitted by the sensor comprises executing a software delay.

4. The method of claim 1, further comprising activating, by the controller based on the synchronized timing scheme, the one or more elements of the display.

5. The method of claim 4, wherein the activation of the one or more elements of the display comprises refreshing the display.

6. The method of claim 4, wherein the activation of the one or more elements of the display comprises the control, through pulse width modulation, of the display.

7. The method of claim 1, wherein dynamically altering a subsequent timing of the infrared pulses comprises dynamically altering a subsequent timing of the infrared pulses based on detection of a detected event in a display control signal.

8. The method of claim 1, wherein the sensor is configured to only emit the infrared pulses when the one or more emissive elements of the display are off.

9. The method of claim 1, wherein the controller comprises one or more computer processors.

10. The method of claim 1, wherein:
detecting the first timing of activation of the one or more emissive elements of the display comprises detecting the first timing of the activation of the one or more emissive elements using a sensor; and
detecting the second timing of the infrared pulses emitted by the sensor comprises detecting the second timing of the infrared pulses emitted by the sensor using a sensor.

11. The method of claim 1, wherein:
detecting the first timing of activation of the one or more emissive elements of the display comprises detecting first timing data;
detecting the second timing of the infrared pulses emitted by the sensor comprises detecting second timing data; and
the method comprise processing the first timing data and the second timing data to generate the synchronized timing scheme.

12. One or more computer-readable storage devices containing instructions that, when implemented by a controller of a computing device that includes a display, cause the controller to perform operations comprising:

detecting, by the controller, a first timing of activation of one or more emissive elements of the display;

detecting, by the controller, a second timing of infrared pulses emitted by a sensor arranged to both emit infrared pulses and detect infrared radiation transmitted through the display;

determining, by the controller based on the first timing and the second timing that were previously detected by the controller, a synchronized timing scheme that staggers the activation of the one or more emissive elements of the display and the emission of sensing pulses emitted by the sensor; and dynamically altering, by the controller based on the determined synchronized timing scheme, a subsequent timing of the infrared pulses emitted by the sensor so that the infrared pulses are emitted by the sensor while the one or more emissive elements of the display are off, reducing an amount of blinking of at least some of the pixels compared to an initial amount of blinking that occurred as a result of the one or more emissive elements of the display activating with the first timing and the sensor emitting infrared pulses with the second timing.

13. A system comprising:
a controller of a computing device for executing computer program instructions;
a display of the computing device; and
one or more computer-readable storage devices comprising computer program instructions executable by the controller, wherein the instructions, when implemented by the controller, cause the controller to perform operations comprising:

detecting, by a controller of the computing device, a first timing of activation of one or more emissive elements of the display;

detecting, by the controller, a second timing of infrared pulses emitted by a sensor arranged to both emit infrared pulses and detect infrared radiation transmitted through the display;

determining, by the controller based on the first timing and the second timing that were previously detected by the controller, a synchronized timing scheme that staggers the activation of the one or more emissive elements of the display and the emission of sensing pulses emitted by the sensor; and dynamically altering, by the controller based on the determined synchronized timing scheme, a subsequent timing of the infrared pulses emitted by the sensor so that the infrared pulses are emitted by the sensor while the one or more emissive elements of the display are off, reducing an amount of blinking of at least some of the pixels compared to an initial amount of blinking that occurred as a result of the one or more emissive elements of the display activating with the first timing and the sensor emitting infrared pulses with the second timing.

14. The system of claim 13, wherein dynamically altering the subsequent timing of the infrared pulses emitted by the sensor comprises executing a hardware interrupt.

15. The system of claim 13, wherein dynamically altering the subsequent timing of the infrared pulses emitted by the sensor comprises executing a software delay.

16. The system of claim 13, wherein the operations further comprise activating, by the controller based on the synchronized timing scheme, the one or more elements of the display.

17. The system of claim 16, wherein the activation of the one or more elements of the display comprises refreshing the display.

18. The system of claim 16, wherein the activation of the one or more elements of the display comprises the control, through pulse width modulation, of the display.

* * * * *